O. C. McCUNE.
Seed-Planter.
No. 26,442.
Patented Dec. 13, 1859.
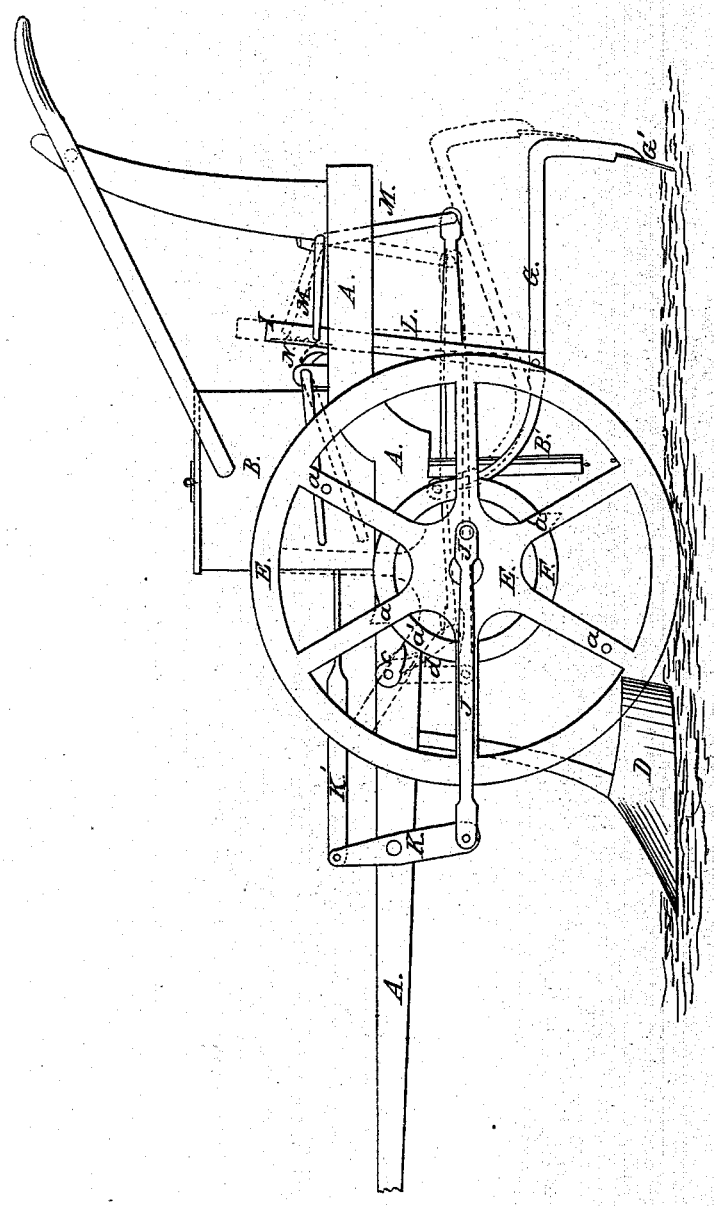
Witnesses:
Milton B. Carry
R. G. Graham
Inventor:
O. C. McCune

UNITED STATES PATENT OFFICE.

O. C. McCUNE, OF DARBY CREEK, OHIO.

IMPROVEMENT IN CORN-PLANTERS.

Specification forming part of Letters Patent No. 26,442, dated December 13, 1859.

*To all whom it may concern:*

Be it known that I, O. C. McCUNE, of Darby Creek, in the county of Madison and State of Ohio, have invented a new and useful Improvement in Machines for Planting Corn in Hills; and I do hereby declare that the following is a full, clear, and exact description thereof, reference being had to the accompanying drawings, making part of this specification, in which—

Figure 1 represents a side elevation of my improved corn-planter with the several parts for covering the corn shown in two positions.

To enable others skilled in the art to understand my invention, I will proceed to describe its construction and operation.

A represents an ordinary plow-beam, upon the top of which is secured the seed-hopper B, with its seed-tube B' leading down behind the plow D sufficiently near the surface of the ground to deposit the corn in the furrow made by the plow with accuracy. The plow D is an ordinary double mold-board, with the mold-boards inclined sufficiently to open a shallow furrow. Immediately in rear of this plow C is a driving-wheel, E, and upon the inside surface of this wheel is a ring, F, with projections $a'$ $a'$ upon its periphery. G is a curved bar, with a scraper, G', which is jointed to the plow-beam in rear of the axle of the wheel E, and which proceeds down a sufficient distance from the seed-tube B' to gather the earth and form the hills over the deposited corn, as hereinafter described.

Eccentrically with the axis of wheel E is pivoted a rod, J, which connects with one arm of a short lever, K, which lever is pivoted to the beam A in front of the driving-wheel. To the outer end of this lever is connected the seed-slide K'. Now, it will be seen that as the wheel E turns the seed-slide will receive a regular reciprocating motion, and that at each revolution of this wheel the seed-corn will be deposited in the furrow made by the plow D preceding the wheel.

In order that the corn may be covered in hills which can be seen by the driver, so that he may regulate the distance of the hills and space thrown out evenly, I have arranged in rear of the seed-tube a jointed scraper and coverer, G G', which is alternately raised and depressed, so as to scrape the earth in hills over the corn and leave the corn in hills at regular intervals along the furrow. This covering operation is effected as follows: A rod, L, connects with the curved bar G and passes up vertically through a slot in the plow-beam and connects with a bent lever, M. The rod L is furnished with rack-teeth, which, in connection with a pawl, N, prevent the coverer G' from rising until it has formed the hill over the seed. Then the pawl is disengaged from the rack by projections $a$ $a$ on the wheel E, and the coverer raised at the same time by the projections $a'$ $a'$ on the ring F coming in contact with a small cam, $c$, which draws forward the arm $d$ and one arm of the bent lever M, and raises the rod L, and immediately the operation of covering the corn is effected.

In order to insure perfect operation with this planter, so that the coverer will be elevated at the instant it reaches the corn which is previously deposited in the furrow, all that is necessary will be to adjust the several parts so that they will work harmoniously with the dropping of the corn from the hopper, which operation is old and well known.

What I claim as my invention, and desire to secure by Letters Patent, is—

The arrangement of the peculiarly-formed rack-bar, rod L, bent lever M, pawl N, ring F, cam $c$, and arm $d$, as and for the purpose herein shown and described.

OSCAR C. McCUNE.

Witnesses:
 R. G. GRAHAM,
 MILTON B. CURRY.